United States Patent

Harwood et al.

[15] 3,704,689
[45] Dec. 5, 1972

[54] DEFLECTABLE POULTRY BEAK APPLIANCE

[72] Inventors: Milton G. Harwood; Louis J. Harwood, both of P.O. Box 38, Farmingdale, N.J. 07727

[22] Filed: Jan. 29, 1970

[21] Appl. No.: 6,727

[52] U.S. Cl. .................................................119/97 R
[51] Int. Cl. ................................................A01k 37/00
[58] Field of Search ......................................119/97 R

[56] References Cited

UNITED STATES PATENTS

| | | | |
|---|---|---|---|
| 2,130,102 | 9/1938 | Rudolph et al. | 119/97 R |
| 2,018,796 | 10/1935 | Layton | 119/97 R |
| 2,154,105 | 4/1939 | Nadler | 119/97 R |
| 2,445,867 | 7/1948 | Wolfson et al. | 119/97 R |

*Primary Examiner*—Hugh R. Chamblee
*Attorney*—Harry Ernest Rubens

[57] ABSTRACT

A poultry beak appliance, such as a shield or blinder made of semi-rigid plastic material having extensions on both sides of the poultry beak for securing the appliance to the beak, said extensions provided with readily flexed end-portions for enabling the extensions to be deflected to release the head of the poultry when accidentally caught in a wire screen.

7 Claims, 8 Drawing Figures

PATENTED DEC 5 1972  3,704,689

MILTON G. HARWOOD
LOUIS J. HARWOOD
INVENTORS

BY Harry Ernest Rubens
ATTORNEY

DEFLECTABLE POULTRY BEAK APPLIANCE

This invention relates to an appliance for attachment to the beak of poultry to prevent damage to other members of the flock arising out of the pecking activities of the birds.

Such a device is normally attached to the beak by a fastener extending through the nostrils of the poultry.

In U.S. Pat. No. 3,066,651, we provided an appliance in the form of blinders which were made entirely flexible to permit release of the blinders when accidentally caught in a wire mesh enclosure within which the birds are usually confined.

However because of the present practice of removing the beak tips of the birds after they are hatched, a shield is presently employed, as appears in our U.S. Pat. No. 3,446,186.

We have found that the shield extensions of the appliance into which the fasteners are inserted are similarly caught by the wire mesh. The shields being made of heavy plastic material to withstand the pecking pressure, the fastener extensions of the shield do not readily deflect when caught in the mesh.

Accordingly a primary object is to provide a fastener shield extension which will readily deflect without loss of security for the fasteners.

Another object is to provide a fastener that is easily rotated in the nostrils of poultry. This serves to clear the nostrils and prevent caking of any feed or dirt that may enter the space.

Other objects are to provide a beak appliance that is made in a simple plastic mold; of semi-rigid plastic; and which preferably uses a deformable wire fastener easy to apply with a simple compressing tool.

We accomplish these and other objects and obtain our new results as will be apparent from the appliance described in the following specification, particularly pointed out in the claims and illustrated in the accompanying drawing in which:

Figure 2:
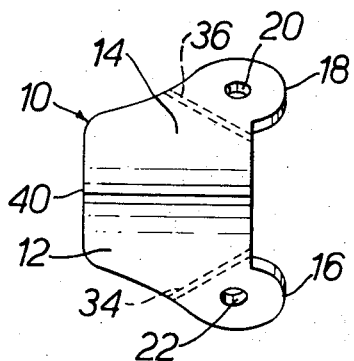
FIG. 2 is a top plan view of the shield itself.
Figure 3:
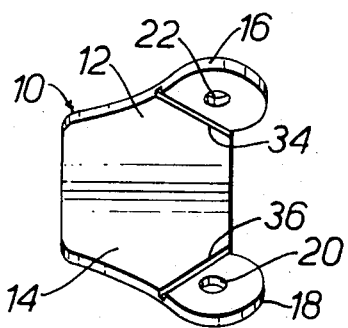
FIG. 3 is a bottom view of the shield.
Figure 4:
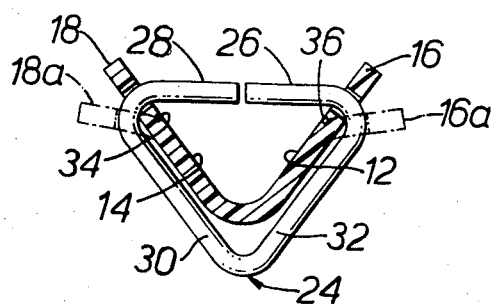
FIG. 4 is a sectional view of the shield with a wire fastener shown in closed position, the deflected view of the shield extensions being shown in dot-dash lines.

Referring more in detail to the drawing the appliance illustrated in FIG. 2, is in the form of a shield 10 as shown in FIG. 4, which is V-shaped, the two legs 12 and 14 of the V-shaped body terminating in ear like extensions 16 and 18 respectively through which openings 20 and 22 are provided.

Figure 1:
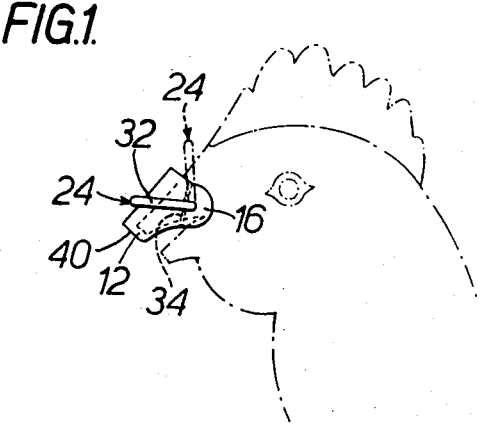
FIG. 1 is a side elevation of the appliance in the form of a shield installed on the beak of poultry.
Figure 5:
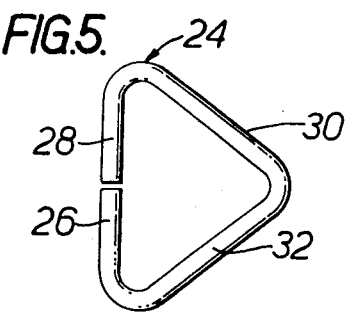
FIG. 5 is a side view of the closed wire fastener.
Figure 6:
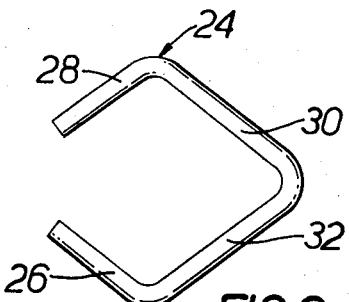
FIG. 6 is a similar view of the wire fastener before closing the ends thereof in the nostrils of poultry.

A wire fastener 24 as appears in detail in FIGS. 4 – 6, is initially formed in diamond shape (FIG. 6) with two ends 26 and 28 being spaced apart to permit insertion over the shield and into openings 20 and 22 of the shield. Compression of the fastener with an appropriate tool, not shown, will drive the two ends 26 and 28 into the nostrils of the poultry forming a triangular shape as is shown in FIG. 5. The two remaining sides of the fastener 30 and 32 follow the V-shaped legs of the shield, with sufficient clearance when installed to permit swinging of the fastener from one side to another as is shown in FIG. 1, note the dot-dash position.

The plastic shield is made of semi-rigid plastic which may be above 1/16 of an inch in thickness. By providing grooves 34 and 36 on the inside of the extensions about where the ears extend from the body the extensions are weakened at the base thereof and may be made to deflect as shown by the dot-dash lines 18a and 16a. The groove may be about 1/32 of an inch in depth, to permit the plastic extension to deflect with the pressures developed by a bird attempting to withdraw its head from a wire mesh into which it has been caught.

Figure 7:
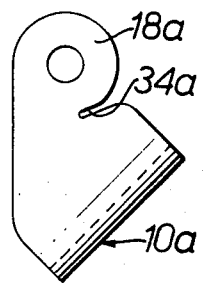
FIG. 7 is a side view of modified plastic shield provided with a slot to permit the semi-rigid plastic extension to deflect under pressure.

Instead of a groove, a slot 34a may be made into the body 10a as is shown in ear 18a of FIG. 7, which makes flexure of the extension easier than the solid plastic section.

Figure 8:
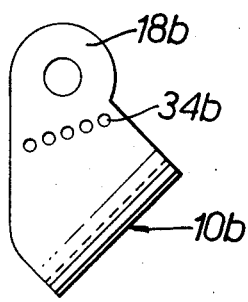
FIG. 8 is a side view of a shield showing a further modification of the extension.

Another modification is shown in FIG. 8 which comprises the uses of perforations 34b in leg 18b of body 10b.

In all cases it will be noticed that the thickness of the ears has been maintained to give adequate bearing for the fastener extending therethrough. Thus it will prevent buckling or loss of support from wear.

The thickness of the body also prevents buckling or wear at the shielding surface 40 and at the same time is sufficiently thick to prevent damage to adjacent poultry from the beak beyond which the shield projects as in FIG. 1.

We have thus described our invention, but we desire it understood that it is not confined to the particular forms shown and described, the same being merely illustrative, and that the invention may be carried out in other ways without departing from the spirit of our invention, and accordingly we claim all equivalent instrumentalities coming within the scope of the appended claims, and by means of which objects of our invention are obtained and new results accomplished since the particular emdodiments herein shown and described are only some of the many that can be employed to obtain these objects and accomplish these results.

I claim:

1. A poultry beak appliance which comprises a plastic body portion for mounting on a poultry beak to prevent damage from pecking, said appliance comprising a body portion and oppositely directed integrally extending ear portions, said ear portions having apertures therein and being provided with weakened portions to permit flexing of said ear portions along said weakened portions, fastener means having projecting end members insertable through said apertures of said ear portions and into the nostrils of the poultry, said fastener being deformed to secure the body of the appliance to the nostrils of the poultry, said fastener means capable of guiding said ear portions when said ear portions are flexed whereby the ear portions are capable of being flexed along said weakened portion to permit the poultry to withdraw its head from a mesh-type fence enclosure and said ear portions can thereafter spring back to the normal non-flexed positions.

2. The poultry beak appliance of claim 1 wherein the weakened portion is formed by a slot running parallel to the surface of the ear portions.

3. The poultry beak appliance of claim 1 wherein the weakened portion is formed by a slot extending entirely through the body wall.

4. The poultry beak appliance of claim 1 wherein the weakened portion is formed by a series of holes formed in the body.

5. The poultry beak appliance of claim 1 wherein the fastener is made of wire and and the appliance body, is mounted to permit only the fastener to rotate in the nostrils of poultry when mounted thereto.

6. The poultry beak appliance of claim 5, in which the fastener is provided with a loop extending over the body portion of the appliance having a length greater than the periphery of the enclosed body portion to permit pivoting movement of the fastener in the nostrils of the poultry.

7. The poultry beak appliance of claim 1 having an outside and an inside surface, wherein the weakened portion is formed by removing a part of the ear portions on the inside surface thereof to permit maximum deflection.

* * * * *